March 17, 1959  A. P. CAWL  2,878,074
RESILIENT WHEELS
Filed May 24, 1956

INVENTOR.
ALLEN P. CAWL
BY
*Thomas C. Betts*
HIS ATTORNEY

United States Patent Office 2,878,074
Patented Mar. 17, 1959

2,878,074

RESILIENT WHEELS

Allen P. Cawl, Noroton Heights, Conn., assignor to Electrolux Corporation, Old Greenwich, Conn., a corporation of Delaware Application May 24, 1956, Serial No. 587,093

3 Claims. (Cl. 301—63)

My invention relates to load supporting wheels and more particularly to wheels of this type having inherent resiliency and intended for supporting objects such as vacuum cleaners.

In accordance with my invention I provide a wheel which has a plurality of substantially concentric portions of different diameters, the outermost of which constitutes the rim of the wheel, while the inner portions serve to connect the rim to a hub part and, by virtue of being connected to each other and to the rim part by reverse or return bends give the wheel resiliency. Preferably, there is an even number of return bends so that when the wheel is deformed under load the rim or tread portion will remain flat on the supporting surface. Resiliency in a wheel of this nature for supporting a vacuum cleaner or the like is of importance in order that the wheel may absorb the shock resulting from impact if the device is accidentally dropped, thus greatly reducing transmission of the shock to the cleaner.

Further objects and advantages of my invention will be apparent from the following description when considered in connection with the accompanying drawings which form part of the specification, and of which;

Figure 1:
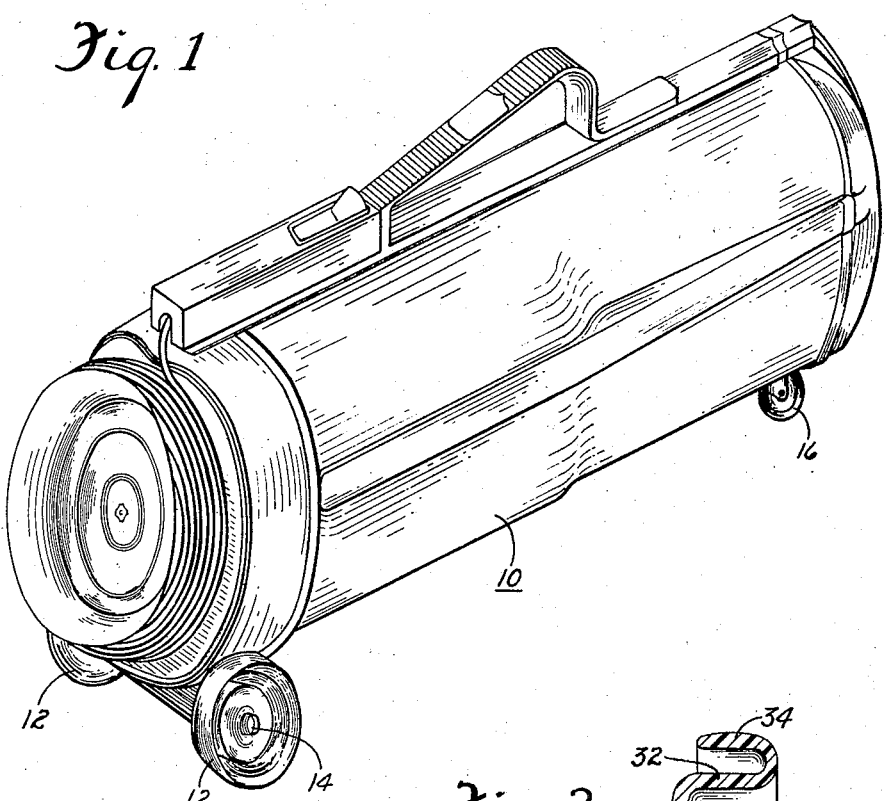
Fig. 1 is a perspective view of a wheel in accordance with my invention used for supporting a vacuum cleaner.

Referring to the drawings, reference character 10 designates generally a vacuum cleaner of the tank type. This cleaner is adapted to be supported on a horizontal surface such as a floor and to be moved about during operation by means of a suction hose connected to one end of the cleaner. Consequently, ease of movement over the floor is essential and for this reason the vacuum cleaner is provided with a pair of wheels 12 rotatably mounted on a fixed axle 14 at one end of the cleaner, and with a castered wheel 16 near the other end.

An electric motor is disposed in the cleaner 10 near the end thereof on which the wheels 12 are mounted, whereas a dust bag is enclosed within the other end and consequently the major portion of the weight of the cleaner is supported by the wheels 12. Therefore, it is desirable that these wheels be resilient in order to absorb the shock resulting from accidental dropping of the cleaner. The castered wheel 16 may also be made resilient, but it is not so important.

Figure 2:
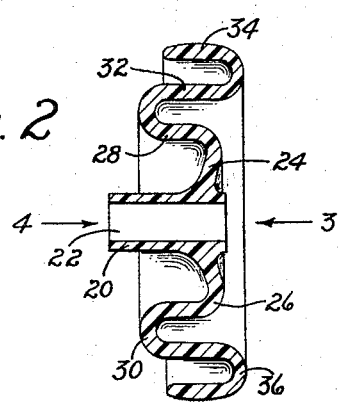
Fig. 2 is a cross-sectional view on an enlarged scale of a wheel in accordance with the present invention.
Figure 3:
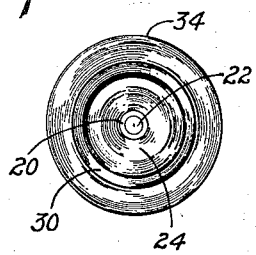
Fig. 3 is a view in elevation of the outside of the wheel shown in Figs. 1 and 2.
Figure 4:
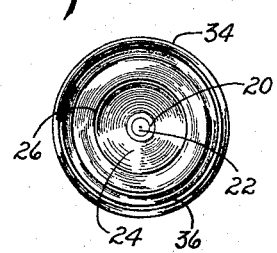
Fig. 4 is a view in elevation of the inside of the wheel.

Fig. 2 shows in detail the construction of one of the resilient wheels 12. It is shown as being a one piece molded part and may be made of high impact styrene, although other plastic materials or metal might be used.

As shown, it includes a hub part 20 having an axial bore 22 intended to receive the axle 14. Extending radially from hub part 20 is an intermediate annular web part which includes a more or less radial portion 24 which is joined by a substantially right angle bend 26 to one end of an inner cylindrical portion 28, the other end of which is joined by a return bend 30 to one end of an outer cylindrical portion 32. The other end of this portion 32 is joined to an outer rim part 34 by means of a return bend 36. Thus, it will be seen that the outer rim part is connected to the hub by means of a web formed with an even number of return bends, namely two, designated by reference characters 30 and 36.

Thus, if the wheel is subjected to a radial acting force of sufficient magnitude to deform the material of the wheel, such as the impact resulting from accidental dropping of the vacuum cleaner, the web portion will be deformed by further bending of the return bends 30 and 36. This will result in a slight reduction in the radial distance from the hub 20 to the rim 34 on the loaded side of the wheel, thus absorbing the shock and materially reducing the transmission thereof to the vacuum cleaner 10. During this deformation of the wheel, the rim portion 34 will remain substantially flat with respect to the supporting surface and it will also be flattened out slightly in a circumferential direction, thus increasing the area of contact between the rim and the surface and consequently distributing the load so as to reduce the likelihood of the wheel being fractured.

A wheel so constructed has the advantage of high strength without excessive weight and experience has shown that a wheel of this nature is able to absorb the shock resulting from the dropping of a vacuum cleaner without resulting injury to the wheel itself or to the cleaner.

While I have shown and described one more or less specific embodiments of my invention, it is to be understood that this has been done for the purpose of illustration only and that the scope of my invention is not to be limited thereby, but is to be determined from the appended claims.

What I claim is:

1. A unitary molded wheel for a vacuum cleaner comprising a circular smooth rim, a concentric hub, and an intermediate web connecting said rim and hub and having oppositely disposed folds, said wheel being of material having inherent resiliency capable of absorbing shock of impact, the folds and the thinness thereof contributing to such resiliency, and the rim defining a continuous circle capable of rolling smoothly on a supporting surface, said hub being of greater axial length than the folds of the wheel within the confines of said rim.

2. The structure of claim 1 in which said rim is axially offset relative to the hub with one end of the hub spaced inwardly from the plane of the rim at the corresponding side of the wheel.

3. The structure of claim 1, said wheel being composed of plastic on the order of styrene.

References Cited in the file of this patent

UNITED STATES PATENTS

| | | |
|---|---|---|
| 2,207,290 | Hale | July 9, 1940 |
| 2,603,267 | Simpson | July 15, 1952 |

FOREIGN PATENTS

| | | |
|---|---|---|
| 22,863 | Great Britain | May 12, 1910 |